Feb. 7, 1961    R. J. SCHNEEBERGER ET AL    2,971,052
IMAGE TRANSLATING SYSTEM
Filed May 29, 1958
Fig. 1
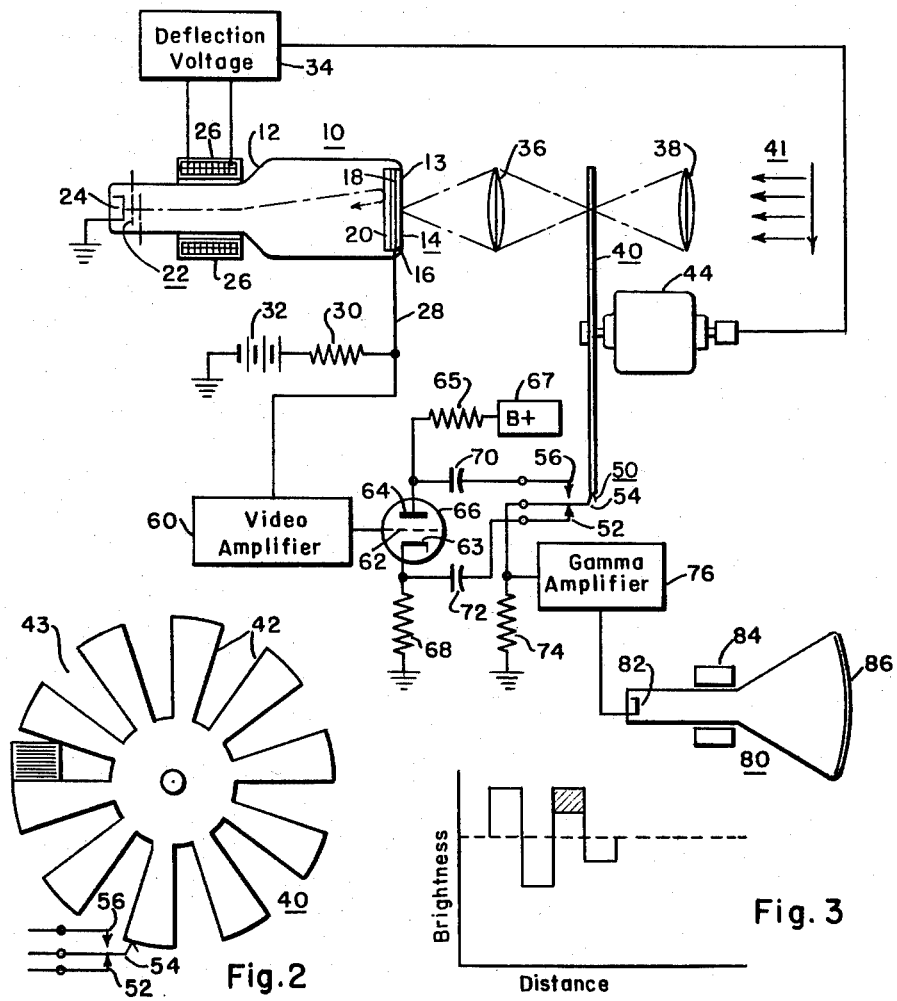
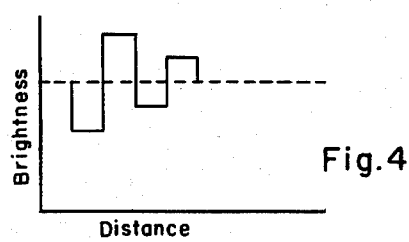
Fig. 2
Fig. 3
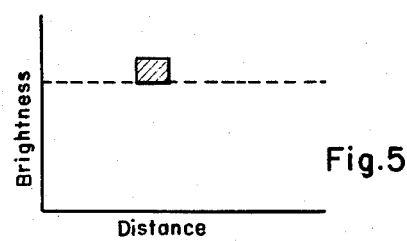
Fig. 4
Fig. 5
WITNESSES
Leon J. Faga
Leon M. Garman
INVENTORS
Robert J. Schneeberger and
Max Garbuny
BY
Charles F. Renz
ATTORNEY

United States Patent Office 2,971,052
Patented Feb. 7, 1961

2,971,052

IMAGE TRANSLATING SYSTEM

Robert J. Schneeberger, Pittsburgh, and Max Garbuny, Penn Hills, Pa., assignors to Westinghouse Electric Corporation, East Pittsburgh, Pa., a corporation of Pennsylvania Filed May 29, 1958, Ser. No. 738,713

4 Claims. (Cl. 178—6.8)

This invention relates to image translating systems and more particularly to systems utilizing a pickup tube and a display tube and means associated with said pickup tube for cancellation of the background pattern in the displayed image.

This invention is directed to those systems in which a pickup tube is utilized having a radiation sensitive target from which an output signal is derived by means of a scanning electron beam. In this type of system the scanning or reading beam derives a signal from each element of the scanned radiation sensitive target. In the vidicon pickup tube, for example, one type of signal is that due to variation in light intensity of each scene element which is projected onto the photoconductive type target of the tube. The electrical signals derived from the photo-conductive type target by means of an electron beam are impressed on a display system such as a cathode ray tube so that spots of varying light intensity are displayed on the screen corresponding to the electrical signal derived from each element of the pickup tube. The light emission from each element of the display screen is retained during the interval between successive frames by the persistence of the display phosphor of the display screen so that the effect on a suitable light integrating system such as the human eye is that of a steady scene.

It has been found that there is also another signal produced in scanning the target of a pickup tube which is due to variations from element to element of the target and is referred to as non-uniformity dark current. These variations are present at all times even in the absence of a scene and produce an undesirable pattern which is superimposed on the scene. This pattern may take the form of a mottled or grainy appearance which often seriously limits the sensitivity of the pickup tube. These patterns are present in all pickup tubes having a radiation sensitive target. The target structure in the radiation sensitive type tubes is usually quite large in lateral dimensions compared to the thickness or the transverse dimension of the target member. The techniques for fabricating such a target are continually improving, but it is still found that non-uniformity in the thickness and other factors result in non-uniformity of the transverse resistivity, that is, the resistivity through the thickness of the target. Another cause of this objectionable pattern is that in practical electron focusing devices, the electrons do not always strike the target in a uniform manner that is normal to the target or in focus at the target over the entire surface. This is particularly the case near the target's periphery. In a typical pickup system, the magnitude of the differential output current $di$ is related to the magnitude of the differential incident radiation by the formula $di = Ci_0 dT$, where C is temperature coefficient of some electrical property of the target such as resistivity or electron emission, $i_0$ is the current derived when there is no radiation incident on the target and which is referred to as dark current,
and $dT$ is a differential amount of incident radiation. From the formula it can be seen that a fairly high value of $i_0$ is thus necessary in order to obtain a large $di$. Variations in $i_0$ over the target caused by the above-mentioned defects in the system serve only to obscure scene information.

The cancellation of such signals has been attempted in other electronic systems such as radar by approaching the problem of adding two signals containing positive and negative information. It is obvious that to attempt such a system with regard to an image display would result in a complicated electronic mechanism so that the information might be stored for one raster and then the intelligence of the second raster subtracted from the first signal. This is not only complicated but extremely expensive.

It is accordingly an object of this invention to provide an improved system for cancellation of variation in background pattern inherent in image pickup systems so as to display a scene representative of only the scene information.

It is another object to provide an improved system for increasing the signal-to-noise ratio of signals derived from an imaging pickup tube.

It is another object to provide an image translating system which will yield a high quality display image with substantially no interfering background variation pattern.

It is another object to provide an improved system which provides means of cancellation of the variation in background pattern in a pickup tube without complicated and expensive apparatus.

These and other objects of this invention are effected as will be apparent from the following description taken in accordance with the accompanying drawing throughout which like reference characters indicate like parts, and in which:

Fig. 1 is a schematic illustration of an image translation system incorporating the teaching of this invention;

Fig. 2 is another view of the shutter shown in Fig. 1; and

Figs. 3, 4 and 5 illustrate for explanatory purposes the effect obtained from this invention.

Referring in detail to Fig. 1, there is shown a pickup tube 10 of suitable design such as a vidicon which is comprised essentially of an evacuated envelope 12 having a target member 14 positioned at one end of the envelope 12 and onto which the scene is projected through an input window 13 capable of transmitting scene information. The target member 14 is comprised of a support member 16 capable of transmitting scene information and having an electrical conductive coating 18 on the inner surface thereof and a layer of photoconductive material 20 on the electrical conductive layer 18. An electron gun 22 having at least a cathode 24 is provided at the opposite end of the envelope 12 for generating an electron beam for scanning a raster on the target member 14. Suitable deflection means 26 are provided on the exterior of the envelope 12 for deflecting the electron beam to scan the raster on the target 14. It is also necessary to provide adequate focusing coils (not shown) on the exterior of the envelope 12 in a well-known manner.

A lead-in 28 is provided from the exterior of the tube 12 to the conductive coating 18 of the target 14 and provides means of deriving the electrical output signal from the target member 14. In the specific circuit shown, the lead-in 28 is connected through a resistor 30 to the positive terminal of a suitable voltage source illustrated as a battery 32 which may be of a potential of about 50 volts. The negative terminal of the potential source 32 is connected to ground and the cathode 24 of the electron gun 22 is also connected to ground. A suitable deflection voltage source 34 is connected to the deflection yoke 26 and provides the necessary voltage for deflecting the electron beam to scan a raster on the target member 14.

A suitable lens system is provided in front of the input window 13 of the pickup tube 10 and may be comprised of two lens members 36 and 38 so as to form a double objective lens system. A segmented shutter member 40 is placed in the focal plane of the double objective lens system. The lens system and the shutter member 40 are located between the scene 41 and the radiation sensitive target member 14 of the pickup tube 10. One focal plane of the image is on the target 14 of the pickup tube and the other focal plane of the lens is in the plane of the segmented shutter member 40. This arrangement is utilized because it is generally inconvenient to place the shutter member 40 substantially in the plane of the target 14. The shutter member 40 is illustrated as circular and has radial segments 42 separated from each other by open portions 43 substantially equal in size to the shutter segments 42. It will be apparent that the shutter 40 may be of other forms. It is only necessary that the shutter be such that the scene may be removed from the target for a predetermined length of time in a predetermined manner. The shutter member 40 is rotated by a motor 44 or any other suitable means. The motor 44 is rotated and the speed is synchronized with the scanning mechanism 34 of the pickup tube so that during every other frame a shutter segment blocks scene information from the target. It is necessary that the shutter segments 42 and the open portions 43 between the segments 42 be of sufficient size so that during the operation of the device a shutter segment 42 can effectively block the transmission of scene information to the target 14 and an open portion will allow all scene information to pass through.

Associated with the rotating shutter member 40 is a mechanical commutating means which consists of a double pole switch 50 which is mechanically contacted by a movable contact 54 by each shutter segment. This is arranged so that when a shutter segment 42 does not block scene information from the target 14, the movable contact of the switch 50 makes electrical contact with a fixed contact member 52 and when the shutter segment 42 is interposed between the scene and the target, the movable contact member 54 is in contact with contact 56.

The output signal from the pickup tube 10 is derived from output resistor 30 and fed through a suitable video amplifier 60 and onto the grid 62 of a phase inverter tube 66 such as a common triode. The plate 64 of the tube 66 is connected through a resistor 65 to a suitable voltage supply 67 and the cathode 63 of the tube is connected through a suitable resistor 68 to ground. The fixed contact member 56 is electrically connected through a condenser 70 to the plate 64 of the tube 66 and the fixed contact member 52 is connected through a condenser 72 to the cathode 63 of the tube 66. The center movable contact member 54 is connected through a resistor 74 to ground and is also connected through a gamma amplifier 76 to a suitable display tube 80. In the specific embodiment shown the display tube 80 is illustrated as a cathode ray tube which is well known in the art. The cathode ray tube 80 consists of an electron gun 82 for generating an electron beam and suitable deflection means 84 for scanning a raster on the display screen 86 of the cathode ray tube. The display screen 86 is comprised of a material which emits light in response to electron bombardment.

A suitable material is a phosphor material such as that designated by the Radio and Television Manufacturer's Association as a P-4 type phosphor. Examples of such phosphors, which may have a decay time of about $\frac{1}{30}$ second, are: hexagonal zinc sulfide with 0.015 gram mole percent silver in combination with a solid solution of zinc and cadmium sulfides with 0.01 gram mole percent silver; hexagonal zinc sulfide with 0.015 gram mole percent silver in combination with rhombohedral zinc beryllium orthosilicate with 1.4 gram mole percent magnesium. Other suitable phosphors may be found in Leverenz, Introduction to the Luminescence of Solids, John Wiley, 1950, Table 21.

In the operation of the device the shutter member 40 will rotate in a counterclockwise movement so as to move across the target member 14 from the top to the bottom. If it is first assumed that the leading edge of a segment 42 is just starting to cover the target 14 of the pickup tube 10, then, at this time the scene will have been on each element of the target 14 for approximately the same length of time, for example, of the order of $\frac{1}{30}$ of a second. The electron beam as acted upon by scanning mechanism 34 of the pickup tube 10 will have just started to scan a raster from top to bottom of the target on the pickup tube as the shutter segment 42 starts to cover the target member 14. The speed of the scanning movement is substantially the same as the speed of the shutter member 40 covering the target 14 so that the scene displayed on the cathode ray tube 80 within this scanning raster will be an image representative of both the background variation and the scene information. The scanning beam of the pickup tube moves with the leading edge of the segment 42. The signal applied to the display tube 80 element by element of a small portion of the screen 86 might be that as illustrated in Fig. 3.

In this first frame the movable contact 54 is in contact with fixed contact 52. The output signal from the pickup tube is fed through the video amplifier 60 and then to the grid 62 of tube 66. The signal is derived from the resistor 68 and fed to the display tube 80.

When the shutter segment 42 has completely covered the target 14, the electron beam in the pickup tube will start to scan a second raster from top to bottom and the speed of scan from top to bottom will again be the same speed as the shutter member 40 so that the electron beam will be moving substantially along the trailing edge of the shutter segment 42. By this process since the shutter segment 42 covers an element on the target almost immediately after the intelligence on the element is read by the electron beam during the first scanning raster and no scene information will be projected onto the element of the target 14 until after the element is read again during the second scanning raster. Therefore, no scene information will be obtained from the target by the electron beam during the second scanning raster. This second frame scanned by the electron beam will be displayed on the display tube 80 and will modulate the electron beam of the display tube 80 in reverse direction with respect to the first scanning raster in a manner illustrated in Fig. 4.

In this second frame only the background signal is derived. The movable contact 54 is in contact with fixed contact 56 in this frame. The output is derived from the plate 64 of the tube 66 and the signal is reversed with respect to the signal across the resistor 68. It should be noted that the electron gun current in the display tube 80 is set at an average value so that negative or reverse modulation of the beam, that is negative with respect to an average brightness, will not cut the electron beam off. After the trailing edge of the shutter segment 42 has passed over the target 14, the leading edge of the next shutter element will start to cover the target 14. At this instant the electron beam starts to scan a third raster from top to bottom which is again representative of the combination of the scene and the background variation. In this manner since most tubes are of the storage type, each element will have the scene information impinging thereon for the same length of time prior to reading over the entire screen.

As explained above, the first scanned raster which is representative of the scene and background is displayed on the display screen 86 of the cathode ray tube 80 and the emission of light continues for a time period dependent on the persistence of the phosphor in the display screen 86. This persistence may be of the order of less than 1/30 second such that the light output has decayed to substantially zero at the time the second scanned image or frame which consists only of background information is displayed on the display screen 86. The time period of scanning one raster should be of the order of 1/30 of a second so that both the first and second images are displayed in 1/15 of a second. The human eye or any suitable light-integrating device will integrate this information and will see an image over and above the average brightness of the entire display representative of only the scene information as is illustrated in Fig. 5.

The scanning rate of a particular pickup system is generally determined according to the nature of the target in the pickup tube, the desired sensitivity and the nature of the information, storage and display systems. There is no general optimum scanning rate but depends on the particular application. In a specific embodiment shown, the display screen has a phosphor of the ordinary persistence utilized in television and relies on the human eye to store information between scanning rasters. The scanning rate normally would be of the order of 1/30 and 1/60 of a second. It is, of course, obvious with the use of phosphors of longer persistence, a longer scan rate would be possible.

In the system illustated, a cathode ray tube display has been utilized, but it is obvious that other display systems could be utilized such as described in U.S. Patent 2,888,593, issued May 26, 1959. In these display devices an electroluminescent cell is utilized for each display element and the signal is impressed on a nonlinear dielectric capacitor associated with the electroluminescent cell. The capacitor stores the signal so that the electroluminescent element gives off a constant illumination until the signal is removed from the capacitor. By utilization of this type of device, one would not have to rely on the retention of the human eye, but only utilize the human eye for integrating the brightness of the two images.

The described device relies on the fact that the brightness display is proportional to the electrical signals and this holds approximately true for small dynamic ranges. Linearity over a wide range can, however, be established by utilization of gamma correction circuits in a well-known manner. Inclusion of such a circuit element 76 has therefore been shown in the specific embodiment.

While the invention has been shown in only one form, it will be obvious to those skilled in the art that it is not so limited but is susceptible of various changes and modifications without departing from the spirit thereof.

We claim as our invention:

1. A background pattern canceling system for an image translation system which employs a pickup tube having a radiation sensitive target, a shutter means positioned between said target and the viewed scene and substantially in the target focal plane, said shutter means having segment portions and open portions of substantially equal size as the target raster, a shutter actuating means synchronized with the scanning mechanism of the pickup tube, whereby the shutter portions and open portions sequentially are interposed between said target member and said scene and a phase inversion means actuated by movement of said shutter means whereby the polarity of the output signal of the pickup tube is reversed in every frame, and means for superimposing said scanned image on a display tube of such time sequence that the information is integrated.

2. An image translating system comprising a pickup tube having a radiation sensitive target, means for generating and deflecting an electron beam for deriving an electrical signal representative of a signal impressed on said target, said signal comprised of a signal component corresponding to a scene viewed by said pickup tube and a signal component due to background signal inherent in said system, means for deriving a first signal representative of said scene and background information, means for deriving a second signal representative of said background information, means for displaying said first and second signals sequentially on a display screen, means for reversing the polarity of one of said signals to control the brightness of the display so that the eye integrates said two display images and views an image of only the scene information above a predetermined brightness level.

3. An image translating system for viewing a scene and displaying a light image representative of the viewed scene information comprising a pickup tube having a radiation sensitive target, means for generating and deflecting an electron beam to scan a raster and derive a point-to-point electrical signal representative of information on said target, means for deriving a first signal from said pickup tube representative of a component signal corresponding to the scene information viewed by said pickup tube and a component signal due to background information inherent in said system, means for impressing said first signal on a display tube for displaying an image representative of said first signal, means for deriving a second signal representative of said background information and means for superimposing said image in said display tube representative of said second signal, said second signal reversed in polarity to average out the background information in said first and second signals to give a predetermined light level with the scene information superimposed on said predetermined light level when viewed visually.

4. An image translating system comprising a pickup tube and a light display tube, means associated with said pickup tube to derive a first signal representative of information from said pickup tube in response to an image directed thereon, means associated with said pickup tube to derive a second signal representative of information from said pickup tube with said image removed, means for inverting the phase of said second signal and means for displaying said first signal and said inverted second signal sequentially on said display tube to provide an integrated light signal representative of said image.

References Cited in the file of this patent

UNITED STATES PATENTS

| | | |
|---|---|---|
| 2,232,190 | Vance | Feb. 18, 1941 |
| 2,442,287 | Edwards | May 25, 1948 |
| 2,775,719 | Hansen | Dec. 25, 1956 |
| 2,816,954 | Huffman | Dec. 17, 1957 |